No. 705,127. Patented July 22, 1902.
T. P. PAYNE.
BUILDING SLAB AND MEANS FOR SUPPORTING SAME.
(Application filed Oct. 24, 1901.)
(No Model.) 3 Sheets—Sheet 1.
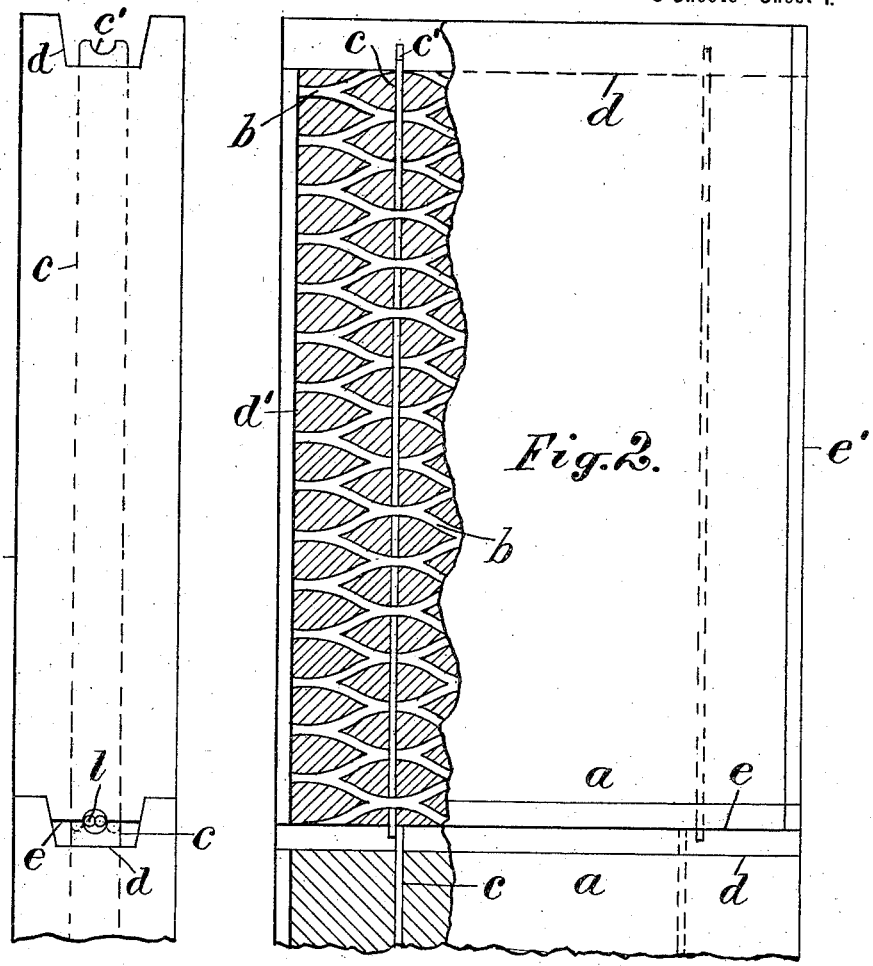
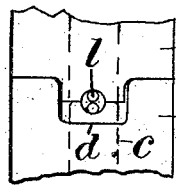
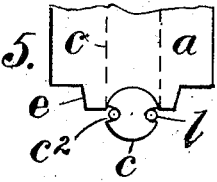
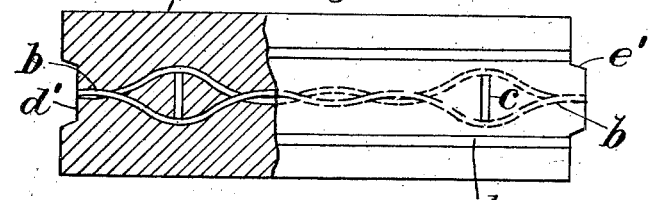
Attest:
L. Lee,
Walter H. Talmage.
Inventor.
Theodore P. Payne, per
Thos. S. Crane, atty.

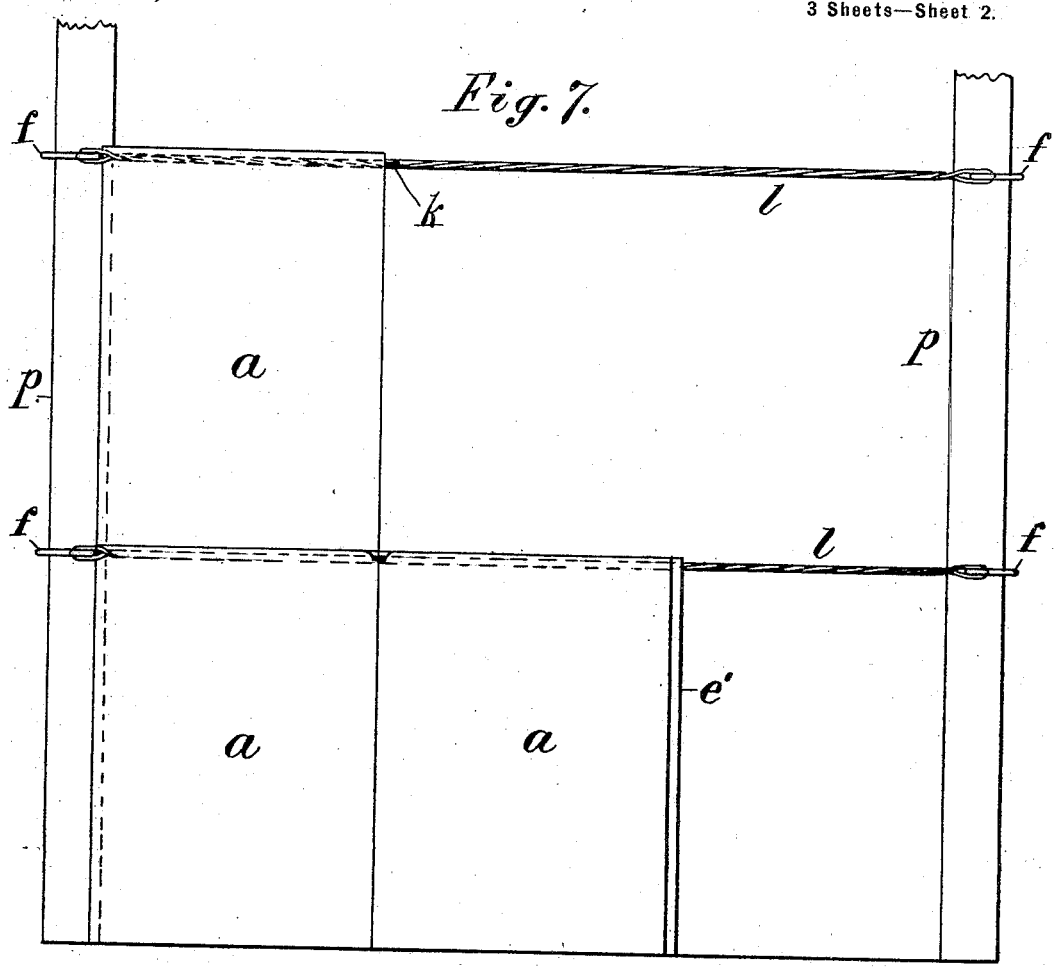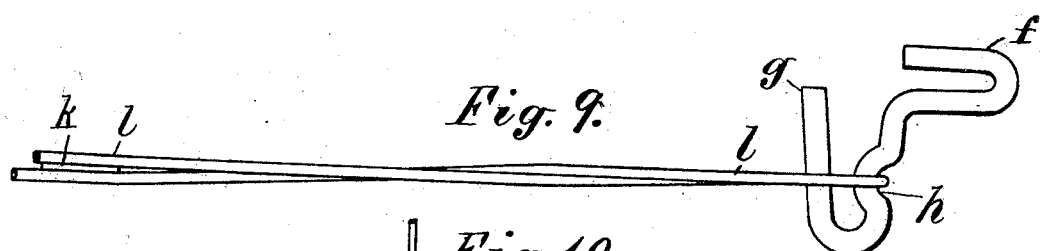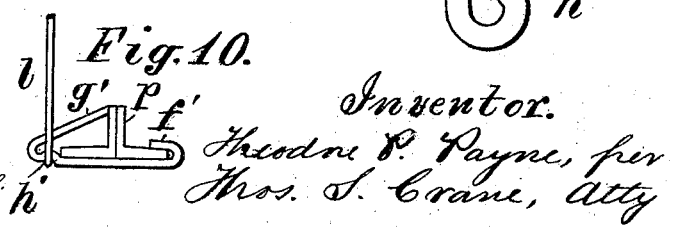

No. 705,127. Patented July 22, 1902.
T. P. PAYNE.
BUILDING SLAB AND MEANS FOR SUPPORTING SAME.
(Application filed Oct. 24, 1901.)
(No Model.) 3 Sheets—Sheet 3.

Attest:
L. Lee
Walter H. Talmage.

Inventor.
Theodore P. Payne, per
Thos. S. Crane, Atty.

UNITED STATES PATENT OFFICE.

THEODORE P. PAYNE, OF IRVINGTON, NEW JERSEY, ASSIGNOR OF ONE-HALF TO SEYMOUR N. ROBINSON, OF NEW ROCHELLE, NEW YORK.

BUILDING-SLAB AND MEANS FOR SUPPORTING SAME.

SPECIFICATION forming part of Letters Patent No. 705,127, dated July 22, 1902.

Application filed October 24, 1901. Serial No. 79,838. (No model.)

*To all whom it may concern:*

Be it known that I, THEODORE P. PAYNE, a citizen of the United States, residing at 1299 Springfield avenue, Irvington, county of Essex, State of New Jersey, have invented certain new and useful Improvements in Building-Slabs and Means for Supporting the Same, fully described and represented in the following specification and the accompanying drawings, forming a part of the same.

The object of the present invention is to furnish an improved construction for the walls or roofs of buildings by which flat slabs (of artificial stone or cement) of large area may be supported in place with the minimum of framing and labor. This object is accomplished by substituting for the frame-bars adjacent to the ends of the slabs a pair of wires secured rigidly at their ends and twisted to place them under strong tension and forming the building-slabs with a groove adapted to receive the wire, and with projecting iron bars having a notch to engage such wires and lock the block thereto. To make flat slabs of large area, I combine the expanded or reticulated metal, which is commonly used in such constructions, with flat brace-bars set edgewise in the slab and preferably threaded through the meshes of the net, so that the net and bars may lie substantially in the center of the slab. The ends of the bars are extended to the upper and lower edges of the slab and are formed with the notches by which the slab is secured to the wires, and the brace-bars thus not only serve to stiffen the slab, but to support it in place upon the building.

The details of my invention will be understood by reference to the annexed drawings, in which—

Figure 11:
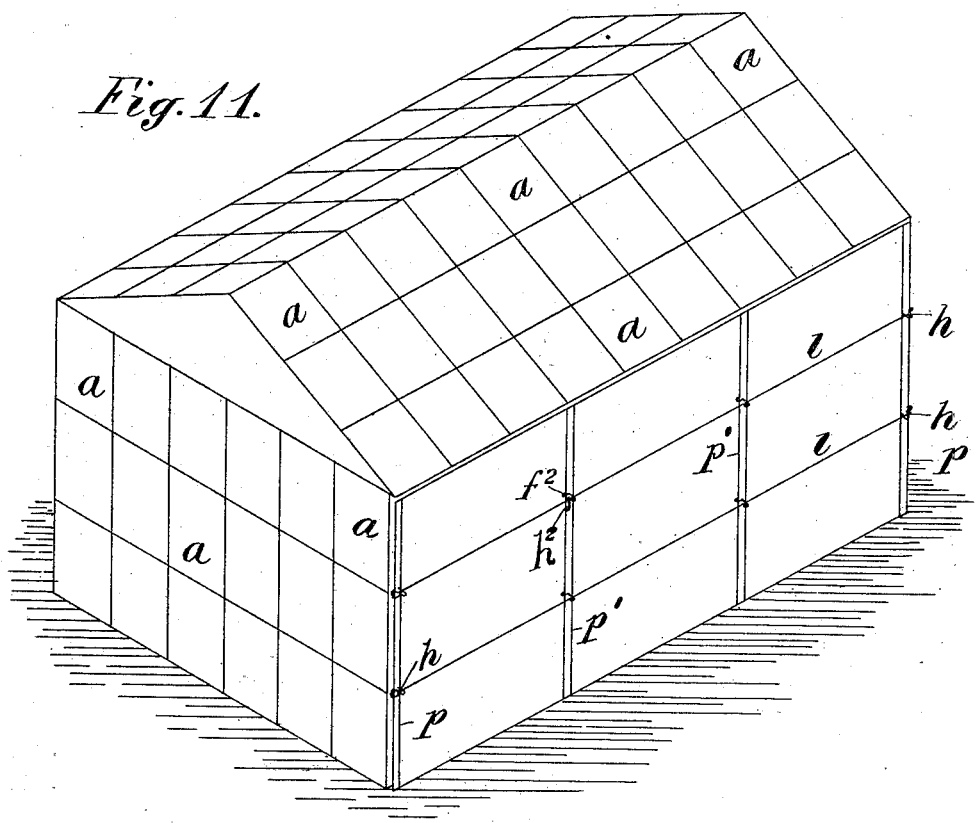
Figure 12:
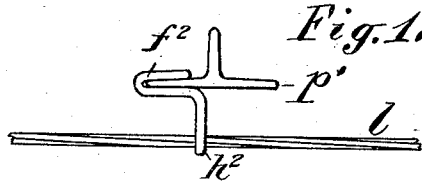
Figure 13:
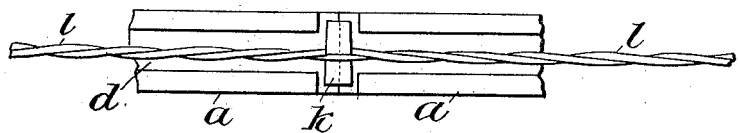

Figure 1 is an edge view of one of the slabs and its joint with another. Fig. 2 is a side view of the same parts, with the left edge of the slabs in section sufficiently to expose the metal net and one of the brace-bars. Fig. 3 is a plan of one of the slabs, showing the top end on the left side in section. Fig. 4 shows a slab-joint with square tongue and groove. Figs. 5 and 6 show the opposite ends of a slab with a further modification of the notches in the brace-bars. Fig. 7 is an elevation of two posts or rafters with the wires and some building-slabs erected thereon. Fig. 8 is a plan of the posts with three slabs in place and the wires extended before the faces of the posts. Fig. 9 is an enlarged view of the adjustable bracket and its connection with the wires. Fig. 10 is a plan of one of the posts with a bracket for carrying the wires at right angles to the face of the post. Fig. 11 is a perspective view of part of a frame for a building, showing the arrangement of the wires thereon and the coupling of the wires to intermediate posts; and Fig. 12 is a plan of such intermediate post with the coupling-clamp attached to the posts and the wires. Fig. 13 is a plan of the groove in two adjoining slabs with the means for twisting the double wires and locking the key in the joint.

$a$ designates the body of the slab, shown with a sheet of expanded metal $b$ in the middle of its thickness and brace-bars $c$, extended through the meshes of the metal and projected from the body at the opposite ends. The net of expanded metal $b$ is disposed flatwise in the middle of the slab, and the brace-bars $c$ stand edgewise, also in the middle, and operate to stiffen the slab transversely. The top of the slab is shown with groove $d$ and the bottom with tongue $e$, adapted to fit partly into such groove and to clear the projecting end of the brace-bar $c$. The brace-bar is shown projected slightly beyond the end of the tongue and notched upon its end to admit the twisted wires, and the end of the brace-bar in the groove $d$ is similarly notched, the parts being so proportioned that the ends of the bars in the tongue and groove may overlap one another, and thus lock the twisted wires between the ends of the bars. The tongue and groove are shown of beveled form in Fig. 1 and of rectangular form in Fig. 4; but any other suitable form may be employed, a space being left between the end of the tongue and the bottom of the groove in all cases to receive the twisted wires. A groove $d'$ and a tongue $e'$ are shown upon the right and left hand edges of the slab, respectively, in Figs. 2 and 3, the engagement of such tongue and groove serving to hold the slabs in line with one another at their lateral edges, while the groove $d$ and tongue $e$ engage the top and bottom edges of the slabs together.

In Figs. 1 and 4 the notch $c'$ to receive the twisted wires $l$ is shown in the middle of the end of each brace-bar; but in Figs. 5 and 6 the end of the brace-bar is shown with two notches $c^3$ in its opposite edges, to which the twisted wires are applied by wedging them apart sufficiently to slip over the end of the brace-bar and drop into the opposite notches. Brackets having each a hook $f$, a foot $g$, and a notch $h$ are shown applied to the posts $p$ in Fig. 7 for the attachment of the wires, the foot being adapted for use with posts of angle, channel, or T form, having a flange at the edge, over which the hook can be wedged and driven tightly. The foot, as shown in Fig. 8, rests upon the face of the post, while the notch $h$ is formed in the side of the bracket at a suitable distance from the face of the post to sustain the wire over the middle of the slabs when they are set against the post. The wires are stretched tightly across the space between the posts and their ends firmly secured, and they are then twisted by inserting a flat bar $k$ (shown in Figs. 7 and 9) between the two wires and winding the wires around one another until the necessary tension is obtained. Fig. 7, in the upper part, shows a right-hand twist at the left side of the bar $k$ and a left-hand twist at the right side, which would necessarily result from such use of the bar, and the bar may be held from rotation to maintain the wires under tension by fitting it in a joint of the slabs, as shown upon the lower twisted wire in Fig. 7.

In applying the slabs to form a wall or roof-covering the brackets for the wires are set upon the posts or rafters at a suitable distance apart to receive the slabs, and one course of the slabs is fitted at the bottom of the posts or rafters, as shown, with the two slabs at the bottom of Fig. 7, the twisted wires being crowded up, if necessary, to introduce the grooved end of the slab beneath the same, and the wires are then fitted to the notch upon the upper end of the brace-bar $c$. The slabs below the first twisted wires are thus inserted side by side, with the tongues $e'$ fitted to the groove $d'$, and cement applied to their vertical joints until the lower row is completed. The slabs of the second row are then fitted between the first and second twisted wires in a similar manner, (one of such slabs being shown at $a$ in Fig. 7,) and cement is applied to the groove $d$, in which the first twisted wires are bedded as the tongue upon each of the second row of slabs is applied to such groove. Such cement not only forms a water-tight joint between the upper and lower ends of the adjacent slab, but wholly embeds and covers the twisted wires, so that they are completely protected from the atmosphere and are not liable to deterioration. The hook $f$ upon the bracket which sustains the twisted wires is held by friction upon the flange of the post, and may thus be readily moved up or down by a blow from a hammer, which affords great facility for adjusting the twisted wires to lie properly in the joints of the rows of slabs. Where the bar $k$ is placed in the joint of the slabs, as shown in Fig. 7, the corners of the slabs are knocked off sufficiently to admit the bar, and the broken portion is replaced by cement when making the joint of the slabs; but the bar may be applied to twist the wires adjacent to an intermediate post between the tension-posts that carry twisted-wire brackets, and the bar may then be secured to such post and the wires held under tension before any of the slabs are applied. Such arrangement of the bar is indicated at $k$ in Fig. 11, where $p'$ is a post intermediate to the posts $p$, and a roof and one wall are formed with the slabs $a$ and one of the side spaces provided with the twisted wires in readiness to receive the slabs. Figs. 11 and 12 show the wires secured to the intermediate posts by clips having foot $f^2$ and terminal hook $h^2$, the foot being jammed upon the flange of the post like the hook $f$ or $f'$, and thus capable of being quickly applied and readily adjusted up and down to set the twisted wire at the proper level.

It will be understood that the wires are made of suitable strength to support any weight or pressure that is actually thrown upon them with the construction described; but where the slabs are connected together vertically in a side wall the wires do not support any vertical load, but simply hold the wall in place against lateral strains.

From the description and drawings it will be obvious that very little framing is required to prepare a building for the reception of such a wall or roof, and it is also obvious that partitions, walls, and roof-coverings can by this system be applied with very great rapidity and with a class of labor much cheaper than that employed in regular mason-work.

Having thus set forth the nature of the invention, what is claimed herein is—

1. A flat building-slab having a sheet of reticulated metal disposed flatwise in its body and bars of flat iron disposed edgewise in its body to stiffen the block against transverse strains.

2. A flat building-slab having a sheet of reticulated metal disposed flatwise in its body and bars of flat iron disposed edgewise in its body and threaded through the meshes of the reticulated metal so that both may lie substantially in the center of the body.

3. A building-slab having flat stiffening bars disposed edgewise in its body, and provided respectively at the opposite ends of such flat bars with a longitudinal tongue and groove and the bars notched at their ends to engage a pair of supporting rods or ropes.

4. A flat building-slab having a sheet of reticulated metal disposed flatwise in its body, bars of flat iron disposed edgewise in its body, and the block provided respectively at the opposite ends of such flat bars with a longitudinal tongue and groove, and the bars notched at their ends to engage a pair of supporting rods or ropes.

5. The combination, with flat building-slabs having flat iron bars disposed edgewise in their bodies and notched at the end, of a wire rope formed of two wires fixed at the ends and twisted to produce tension and engaged with the notches upon the said bars.

6. The combination, with the posts or rafters of a building, and a series of horizontally-disposed ropes formed of wires fixed at their ends and twisted to produce tension, of a series of flat slabs inserted between the several ropes and provided each upon the ends with a tongue and groove, and means in the groove for engaging such wire rope, whereby the slabs are held in a common plane by the series of ropes.

7. The combination, with the posts or rafters of a building, and a series of horizontally-disposed ropes formed of wire fixed at their ends and twisted to produce tension, and flat slabs provided respectively upon their opposite ends with tongue and groove, and having flat iron bars disposed edgewise in the slabs with their ends projected into the said tongue and groove and suitably notched to fit the wire ropes, whereby the slabs may be secured in horizontal series between the ropes and held in place by the engagement of the notched bars and the ropes.

In testimony whereof I have hereunto set my hand in the presence of two subscribing witnesses.

THEODORE P. PAYNE.

Witnesses:
  THOMAS S. CRANE,
  L. LEE.